W. D. WOOD.

FURNACES FOR FINISHING SHEET-IRON.

No. 7,547. Reissued March 6, 1877.

Witnesses

Robt Hunt

C. L. Parker

Inventor: W. Dewees Wood,

By Attorney George H. Christy

UNITED STATES PATENT OFFICE.

W. DEWEES WOOD, OF PITTSBURG, PENNSYLVANIA.

IMPROVEMENT IN FURNACES FOR FINISHING SHEET-IRON.

Specification forming part of Letters Patent No. 46,841, dated March 14, 1865; reissue No. 7,547, dated March 6, 1877; application filed November 18, 1876.

*To all whom it may concern:*

Be it known that I, W. DEWEES WOOD, formerly of McKeesport, but now of Pittsburg, in the county of Allegheny, State of Pennsylvania, have invented a new and useful Improvement in Furnaces for Finishing Sheet-Iron; and I do hereby declare the following to be a full, clear, and exact description thereof, reference being had to the accompanying drawing, making a part of this specification, in which—

Figure 3:
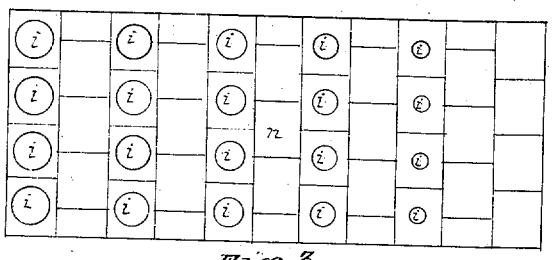
Figure 2:
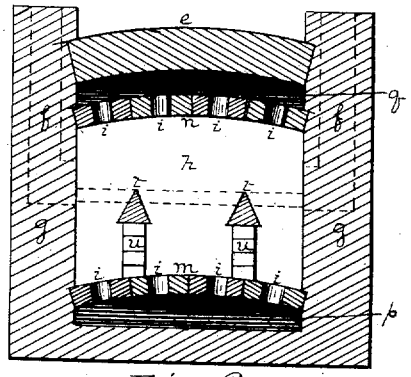
Figure 1:
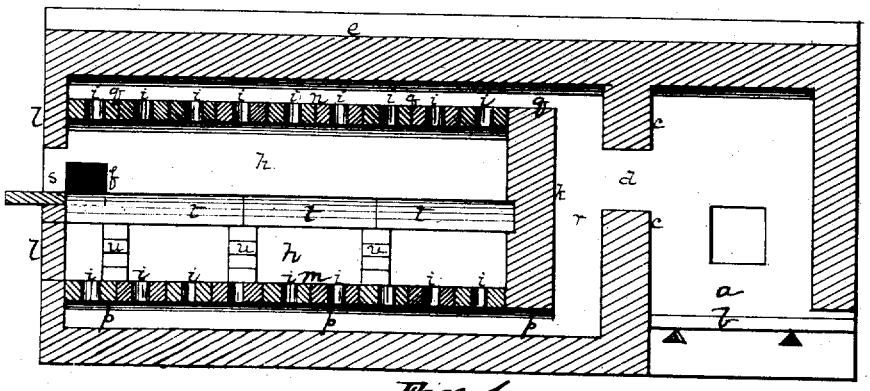

Figure 1 is a longitudinal vertical section of my furnace. Fig. 2 is a transverse vertical section thereof; and Fig. 3 is a top view of the perforated floor of the heating-chamber, the appearance of the roof of the chamber being similar thereto.

In the several figures like letters of reference denote similar parts.

The object of my invention is to overcome a practical difficulty in heating plates of sheet-iron preparatory to the finishing rolling with sufficient uniformity.

After the iron has been reduced to sheets of the requisite degree of thinness, they are heated in a furnace before being operated upon by the finishing-rolls. Being too thin to be operated upon singly, two or more sheets are placed together in a pack and passed through the rolls, by which means the sheets can be rolled thinner than a single sheet could be if rolled alone. In order to secure uniformity of thickness and smooth finish in the sheets thus rolled in a pack, it is very important that all parts of each of the sheets should be, as nearly as possible, at the same degree of heat, and as the sheets, being thin, heat very rapidly, and are only left in the furnace for this purpose two or three minutes, it is important that the heat should be uniform in all parts of the heating-chamber. This it has been found very difficult to accomplish, as that part of the heating-chamber which is nearest to the fire is usually a good deal hotter than the other end near to the door at which the sheets are introduced.

To remedy this difficulty I furnish the heating-chamber with a perforated cover and floor, and conduct the heat and fire from the furnace in two streams, one above the cover and the other below the floor, and as the heat and fire have to enter the chamber to reach the escape-flues they do so through these perforations, which may be uniform in size, but, by preference, gradually increase in diameter as their distance from the fire increases. The sheets of iron to be heated I support on the edge of angular railings raised above the floor, so that the heat may have free access to all parts of the pack of sheets placed in the heating-chamber.

To enable others skilled in the art to construct and use my improved heating-furnace, I will proceed to describe its construction more minutely.

In the drawing, *a* is the fire chamber of the furnace, constructed in the usual way; and *b* represents the gratings or fire-bed. The furnace is built of brick, those parts which are exposed to the action of the fire being constructed or lined with fire-brick. *c* is the back wall of the furnace, which has an opening, *d*, extending transversely across it about midway between the fire-bed *b* and the roof *e* of the furnace, through which opening all the flame, heated air, and fuliginous matter pass on their way to the flues *f f*, situated on each side of the furnace near to the front end, at which the sheets of iron are introduced. The flues *f f* are made one in each of the side walls *g g*, and are arched, so as to meet together in one chimney above the furnace.

The flame and heated air are not allowed to pass at once into the heating-chamber *h*, being prevented from so doing by a perpendicular blank wall, *k*, which is placed parallel to and at a little distance from the back wall *c* of the fire-chamber. The heating-chamber *h* is formed by the side walls *g g*, the back wall *k*, the front wall *l*, and a floor, *m*, and cover *n*. The floor *m* of the heating-chamber is made of fire-bricks, and is raised above the bottom of the furnace, so as to leave a flue, *p*, under the entire floor *m*, as shown in Figs. 1 and 2. The floor is arched, as shown in Fig. 2, the arch springing from the side walls *g g*. The cover *n* is also made of fire-brick, and is arched in the same manner as the floor. It is situated sufficiently below the roof *e* of the furnace to leave a flue, *q*, extending over the entire cover *n* of the heating-chamber. The flues *p* and *q* open at their rear ends into the space *r* between the blank wall *k* and the fire-wall *c*, so that the flame and heat issuing from the fire-chamber *a*, through the passage *d*, enter the space *r*, where they are parted into two streams, one passing upward through the flue *q* over the cover *n*, and the other downward through the flue *p* under the floor *m*.

The chief function of each of the flues *p q* is to distribute the heated air, flame, and products of combustion under or over the floor or covering, and to the perforations therein, presently to be described, so that they shall enter the heating chamber at various points, respectively below or above the level of the sheets placed in such chamber.

To enable the heated air, flame, &c., to enter the heating-chamber *h* so as to produce the best effects, and so as to reach the exit-flues *f f*, openings *i i*, &c., are made in the bricks composing the covering *n* and floor *m* of the heating-chamber.

These openings *i i* may be circular, as shown in Fig. 3, and are smaller at the rear end of the heating-chamber near the fire than at the front end near the door *s*, gradually increasing in size from the rear to the front.

The object of the feature last named is to equalize as much as possible the amount of flame and heat which enters the heating-chamber at all points, above and below.

These openings may, however, if so preferred, be of uniform size, as shown in Figs. 1 and 2, though I consider this a less advantageous way of carrying out my invention.

Instead of placing the packs of sheet-iron to be heated on the floor of the furnace, they are supported above the floor on the rails *t t*, about equidistant between the floor and cover. These rails, of which there are two or more parallel rows, extending from front to rear of the heating chamber, are made of triangular prisms of fire-brick, a cross-section of which is shown in Fig. 2. These prisms *t t*, constituting raised supports or bearings for the sheets, are sustained by pillars *u u*, built up from the floor *m*, and are so placed on them that one of the angles of the triangle forms the top of the rail on which the sheets of iron rest, so that only a very small part of the surface of the sheets is in contact with the rails, and almost the entire surface above and below is exposed to the direct action of the fire.

The door *s* opens directly into the heating-chamber, and through it the sheets of iron are inserted and removed. The top of the rails *t t* is on a level with the bottom of the doorway *s*.

I claim herein as my invention—

1. A sheet-metal-heating furnace having a perforated floor, and bearings elevated above the level of the floor to support the sheets, substantially as set forth.

2. A sheet-metal-heating furnace having a perforated covering, *n*, over the heating-chamber, and bearings to support the sheets, elevated above the level of the floor, and between the floor and the cover, substantially as set forth.

3. A heating-chamber having a perforated cover and floor, arranged relatively to the heat-distributing flues substantially as described, whereby the fire and heated air shall enter the chamber through the openings in the cover and floor at various points above and below the level of the sheets placed therein, for the purposes set forth.

4. A heating-chamber having a series of perforations, *i i*, in the cover and floor, of increasing size from the fire end of the heating-chamber toward the opposite end, substantially as and for the purposes set forth.

In witness whereof I have hereunto set my hand.

W. DEWEES WOOD.

Witnesses:

WEST MCMURRAY,

GEORGE H. CHRISTY.